United States Patent
Diestelhorst et al.

(10) Patent No.: US 9,919,595 B2
(45) Date of Patent: Mar. 20, 2018

(54) FUEL TANK FOR A MOTOR VEHICLE

(71) Applicant: Volkswagen Aktiengesellschaft, Wolfsburg (DE)

(72) Inventors: Axel Diestelhorst, Wolfsburg (DE); Ralf Berlin, OT Wiepke / Gardelegen (DE); Markus Rowitz, Wolfsburg (DE); Ingo Rohs, Ruehen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/582,876

(22) Filed: May 1, 2017

(65) Prior Publication Data
US 2017/0232835 A1    Aug. 17, 2017

Related U.S. Application Data

(63) Continuation of application No. PCT/EP2015/071566, filed on Sep. 21, 2015.

(30) Foreign Application Priority Data

Oct. 30, 2014   (DE) ......................... 10 2014 222 145

(51) Int. Cl.
*B60K 15/03* (2006.01)
*B29C 49/20* (2006.01)
(Continued)

(52) U.S. Cl.
CPC ........ *B60K 15/03177* (2013.01); *B29C 49/20* (2013.01); *B29C 2049/2013* (2013.01);
(Continued)

(58) Field of Classification Search
CPC ............ B60K 15/077; B60K 15/03177; B60K 2015/03493; B60K 15/03; B29C 49/20; B29C 2049/2013; B29L 2031/7172
(Continued)

(56) References Cited

U.S. PATENT DOCUMENTS 6,138,859 A * 10/2000 Aulph .................... B60K 15/03
                                                                   137/574
6,175,260 B1   1/2001 Hahner et al.
(Continued)

FOREIGN PATENT DOCUMENTS

DE    198 33 698 A1    2/2000
DE    101 07 075 A1    9/2001
(Continued)

*Primary Examiner* — J. Gregory Pickett
*Assistant Examiner* — Elizabeth Volz
(74) *Attorney, Agent, or Firm* — Muncy, Geissler, Olds & Lowe, P.C.

(57) ABSTRACT

A fuel tank for a motor vehicle, which can be designed as a blow-molded hollow plastics tank, into the interior of which a functional component support is inserted, to which are fastenable functional components, for example a fuel pump, a level indicator or valves, and which is supported on opposite inner sides of the fuel tank wall via at least two strut arrangements spaced apart from each other in a longitudinal direction of the support. The functional component support has at least one compensating portion which is positioned between the two strut arrangements and with which a length compensation between the functional component support and the fuel tank takes place in order to dissipate mechanical component stresses.

12 Claims, 3 Drawing Sheets

(51) Int. Cl.
*B29L 31/00* (2006.01)
*B60K 15/077* (2006.01)

(52) U.S. Cl.
CPC ....... *B29L 2031/7172* (2013.01); *B60K 15/03* (2013.01); *B60K 15/077* (2013.01); *B60K 2015/03493* (2013.01)

(58) Field of Classification Search
USPC .............................. 220/562, 563, 564, 4.14
See application file for complete search history.

(56) References Cited

U.S. PATENT DOCUMENTS

| | | |
|---|---|---|
| 6,712,234 B2 | 3/2004 | Boecker |
| 6,736,282 B2 | 5/2004 | Krogull |
| 7,909,587 B2 | 3/2011 | Hagist et al. |
| 8,951,461 B2 | 2/2015 | Heim et al. |
| 2004/0129708 A1 | 7/2004 | Borchert et al. |
| 2009/0162472 A1 | 6/2009 | Aoki et al. |
| 2009/0230133 A1* | 9/2009 | Takeuchi ................ B29C 49/20 220/562 |
| 2011/0139342 A1 | 6/2011 | Jannot et al. |
| 2011/0226777 A1 | 9/2011 | Asahara et al. |
| 2012/0298212 A1 | 11/2012 | McClure et al. |
| 2015/0217635 A1 | 8/2015 | Nakane et al. |
| 2015/0343899 A1 | 12/2015 | Furusawa |

FOREIGN PATENT DOCUMENTS

| | | |
|---|---|---|
| DE | 101 28 308 A1 | 1/2003 |
| DE | 102 60 953 A1 | 7/2004 |
| DE | 103 56 061 A1 | 7/2005 |
| DE | 10 2009 030 492 A | 1/2011 |
| EP | 2 328 739 B1 | 7/2012 |
| EP | 2 511 069 B1 | 2/2014 |
| EP | 2 730 445 A1 | 5/2014 |
| GB | 2 493 848 A | 2/2013 |
| JP | 2009-132296 A | 6/2009 |
| WO | WO 2012/139961 A1 | 10/2012 |
| WO | WO 2014/112236 A1 | 7/2014 |
| WO | WO 2014/122747 A1 | 8/2014 |

* cited by examiner

FUEL TANK FOR A MOTOR VEHICLE

This nonprovisional application is a continuation of International Application No. PCT/EP2015/071566, which was filed on Sep. 21, 2015, and which claims priority to German Patent Application No. 10 2014 222 145.5, which was filed in Germany on Oct. 30, 2014, and which are both herein incorporated by reference.

BACKGROUND OF THE INVENTION

Field of the Invention

The invention relates to a fuel tank for a motor vehicle.

Description of the Background Art

According to conventional practice, fuel tanks can be produced from a thermoplastic resin, for example by extrusion blow molding or by welding injection-molded half-shells made of thermoplastic resin. In the interior of such a fuel tank, functional components of the fuel system can be accommodated, as a result of which the space requirement outside the fuel tank is reduced and, in addition, the number of required tank openings is reduced, which is advantageous with regard to emissions from the fuel tank.

DE 102 60 953 A1, which corresponds to US 2004/0129708, discloses a generic fuel tank which is designed as a blow-molded hollow plastic member. In its interior, a functional component support is inserted, to which various functional components, such as a fuel pump, a level indicator or valves, are attached. The functional component support can be a planar baffle wall, by means of which surge movements of the fuel can be reduced during vehicle operation. In addition, the functional component support has strut arrangements, which are spaced apart from one another, of which the supporting legs are supported on opposite inner sides of the fuel tank wall.

In the production of the fuel tank, the functional component support is first fitted with the functional components by forming a pre-assembly unit, which is separate from the fuel tank. The assembled functional component support is then inserted into the interior of a tubular fuel tank preform made of thermoplastic resin. Subsequently, a blow molding process takes place, in which the preform is expanded to its final outer contour in a blow molding tool using blown air and application of heat. During the blow molding process, the functional component support is also welded or glued to the inside of the fuel tank in the region of its supporting legs. At least the supporting legs of the functional component support are made of a plastic material, which is compatible with the plastic material of the fuel tank with regard to weldability.

A rigid connection of the functional component support to the fuel tank is of great importance in order to ensure the functional reliability of the functional components even in extreme driving situations, such as an extreme curve position or an extreme acceleration. The functional component support must therefore be rigidly connected to the fuel tank by means of the supporting legs so as to ensure a torsion-proof, tilt-proof and non-slip positioning in the fuel tank. For such a rigid connection, the functional component support has the abovementioned strut arrangements, which are supported in the installation position between the opposite fuel tank walls.

Due to different conditions, for example temperature fluctuations, pressure fluctuations, component tolerances, material shrinkage, exposure of the vehicle/mechanical action from outside, the fuel tank can change its shape or size. In the case of a rigid connection of the functional component support to the fuel tank, this can produce mechanical component stresses between the fuel tank and the functional component support. The component stresses may have an effect on the functional component carrier, leading to damage to the functional components.

SUMMARY OF THE INVENTION

It is therefore an object of the invention is to provide a fuel tank, in which damage to the functional components is sustainably prevented in a simple manner.

According to an exemplary embodiment, the functional component support can have at least one compensating portion, which is positioned between the two strut arrangements. With the aid of the compensating portion, a length compensation is achieved by means of which mechanical component stresses between the functional component support and the fuel tank can be relieved.

In an embodiment, the functional component support can be, for example, a planar basic body, that is, a surface element, with an elongated support wall. The support wall can extend transversely through the interior of the fuel tank and divides it into partial spaces, whereby fuel surge movements are reduced. The support wall can be divided into individual wall segments. Each of these wall segments may have a strut arrangement to support the respective wall segment on opposite fuel tank walls. For example, the wall segments can be arranged such that they are not connected to one another rigidly, but rather by means of the compensating portion.

In an embodiment, the compensating portion can be designed as a compensating web which can merge into the wall segments integrally in terms of material and/or in one piece. The functional component support can be produced favorably as a one-part plastic component in a plastic injection-molding process, together with the compensating portion and the two strut arrangements.

To form the compensating portion, neighboring wall segments can be spaced apart from one another by a free space which is bridged by the compensating web. The compensating web can, for example, have a loop-like, U-profile-shaped deformation section, which on the inside delimits a free deformation space. The deformation section of the compensating web can deform into the latter under breakdown of the component stresses.

The compensating portion can be designed in such a way that the compensating movements due to component stresses cannot lead to component damage.

Correspondingly, it can be advantageous if a movement guidance and/or a movement stop is assigned to the compensating portion, with the aid of which the compensating movements can be limited.

This can be done, for example, by providing additional guidance or stop elements. However, in view of a simple as well as component-reduced construction, it is advantageous if the movement guidance is implemented directly by adaptation of the compensating web geometry. Thus, the compensating web can be, for example, a flat profile part, the flat sides and narrow sides of which can form a rectangular cross-section. One of the flat sides of the compensating web can limit its above-mentioned deformation space. Depending on the spatial positioning of the compensating web on the wall segments, a favorable compensating movement guidance can be achieved.

In an embodiment, in a first compensating web, the flat sides thereof can be oriented at right angles to the support wall, as a result of which a lateral movement of the wall segments transversely to the longitudinal direction of the support is delimited. At least one support wall web can be connected to the first compensating web, the former being arranged in at least one wall segment and projecting therefrom at a right angle, whereby the functional component support in its entirety is given sufficient dimensional stability, which simplifies handling of the support in the still dismounted pre-assembly state.

In the case of a second compensating web, its flat sides may not be oriented at right angles but rather parallel to the adjacent wall sides of the wall segments. The flat sides of the second compensating web can also merge flush with the adjacent wall segments. For example, the first compensating web and the second compensating web are provided in a common compensating portion. The two compensating webs can bridge the free space between the two wall segments and delimit it transversely to the support longitudinal direction.

By combining the compensating webs arranged at right angles to the support wall and parallel to the adjacent wall sides of the wall segments, any component stresses that occur can be absorbed particularly well. Component stresses can be absorbed in the vertical direction, relative to the functional component support, as well as in the horizontal direction. Component stresses are diverted in this way and a particularly high functionality is achieved under different requirements and conditions, and the longevity of the fuel tank is ensured.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
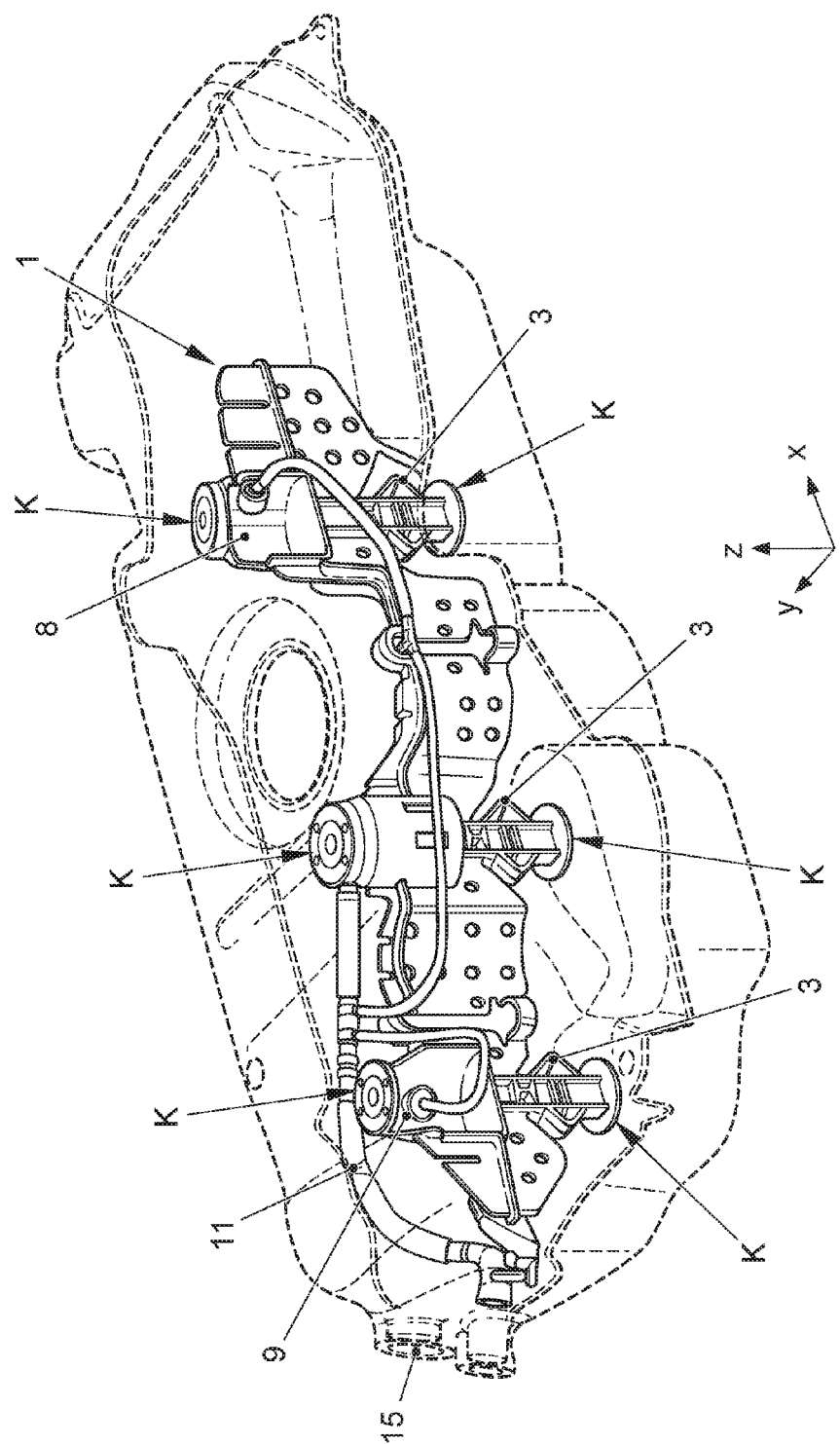
FIG. 1 is a perspective view of a plastic fuel tank, in the interior of which a baffle wall acting as a functional component support is arranged.
Figure 2:
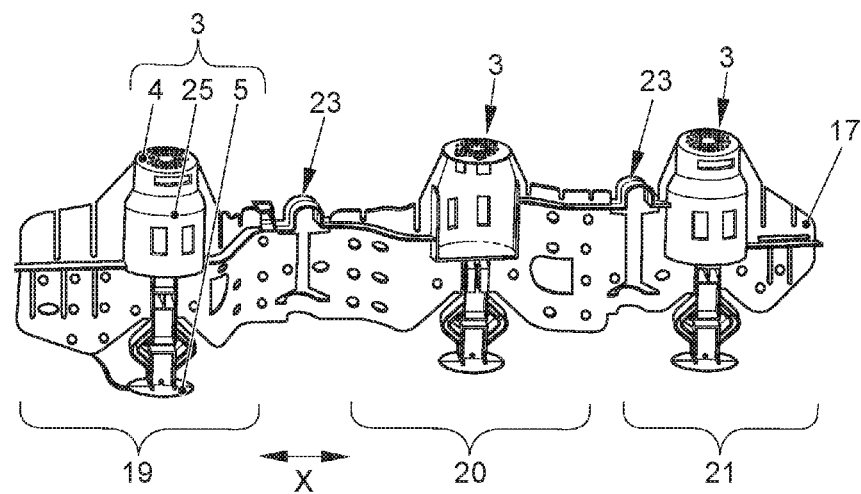
FIG. 2 is a perspective view of the baffle wall alone and with disassembled functional components.
Figure 3:
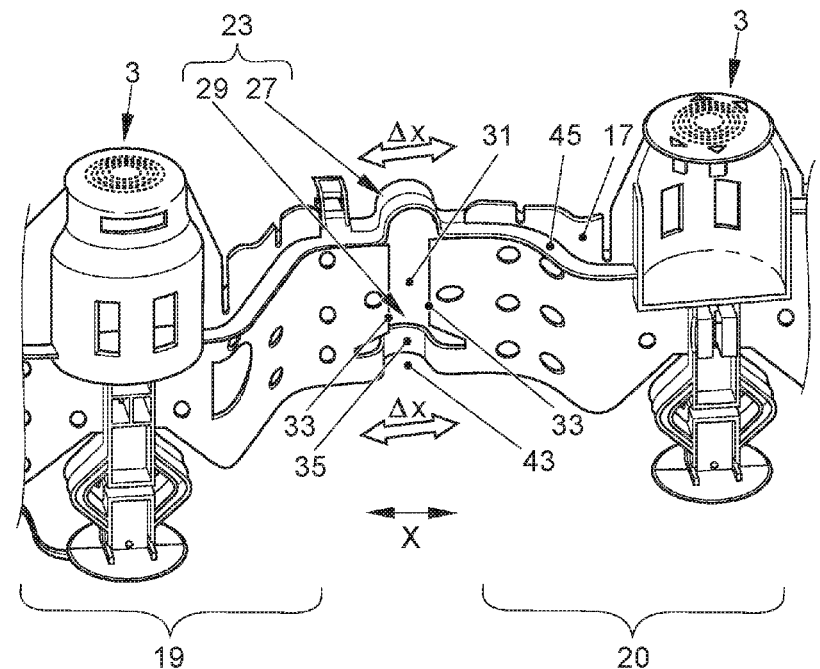
FIG. 3 illustrates, in an enlarged partial view, the baffle wall.
Figure 4:
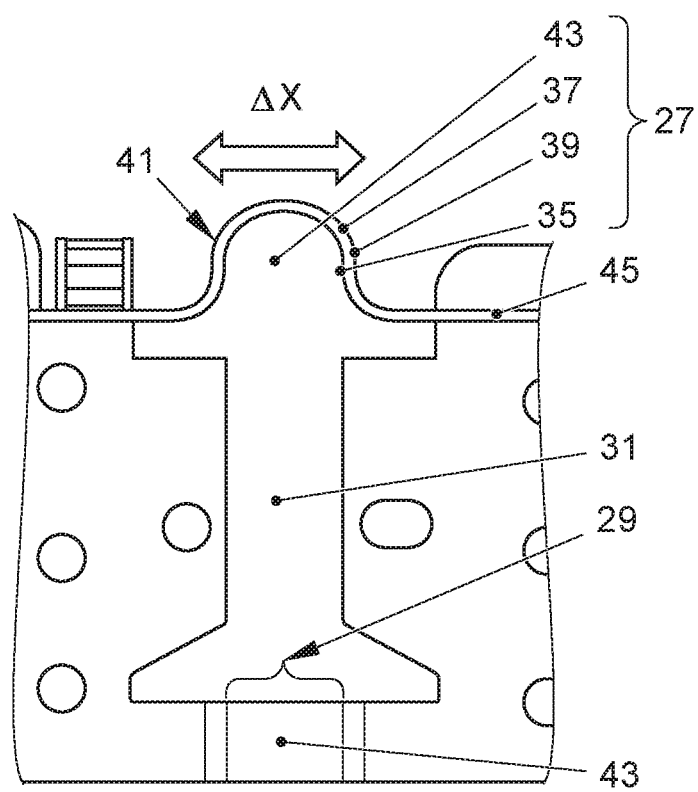
FIGS. 4 and 5 illustrate partial views of a compensating portion of the baffle wall.
Figure 5:
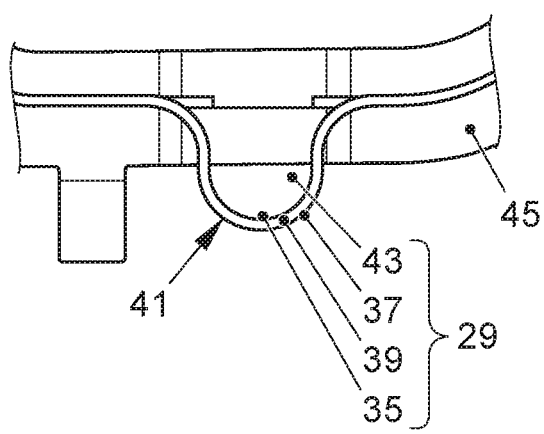

FIG. 1 is a perspective view of a fuel tank made from a thermoplastic resin, which is designed as a blow-molded plastic hollow member. In the interior of the fuel tank, a functional component support 1 is arranged, which is designed as an elongated baffle wall extended in a support longitudinal direction x, which divides the interior of the tank. The baffle wall 1 is also manufactured from a thermoplastic resin, for example in an injection-molding process. As can be seen from FIG. 1, integrated in the baffle wall 1 are a total of three vertical, columnar strut arrangements 3 that are mutually spaced apart in the support longitudinal direction x, which are supported in a vertical direction z between the upper and lower fuel tank wall. For this purpose, according to FIG. 2, each of the strut arrangements 3 of the baffle wall 1 has lower supporting legs 4 and upper supporting legs 5, which are supported on the fuel tank wall under the formation of node locations K (FIG. 1). The node locations K are designed to be rigid to provide the fuel tank and the baffle wall 1 arranged therein with sufficient dimensional stability. The supporting legs are configured in such a way that they can flexibly compensate for movements of the tank. Height compensating springs are integrally formed in the supporting legs, which can react flexibly to an expansion or contraction of the tank and thus ensure a permanent attachment of the functional component support by means of a height compensation.

The baffle wall 1 has a number of connection points to which functional components, such as a fuel pump or venting valves 8, 9, are fastened. In FIG. 1, the venting valves 8, 9 are connected to a vent line 11, which can be guided outwards via a tank connector 15.

The structure of the baffle wall 1 is shown in FIGS. 2 to 5, but without functional parts mounted thereon. The baffle wall 1 is produced of uniform material and in one piece as a plastic component by an injection-molding process. The basic body of the latter is a surface element with an elongated support wall 17 (FIG. 2) which extends in a support longitudinal direction x. The support wall 17 is in turn divided into a total of three wall segments 19, 20, 21, which are connected to one another via a total of two compensating portions 23. In each of the wall segments 19, 20, 21, a strut arrangement 3 is integrated with the respective upper and lower supporting legs 4, 5. Below the upper supporting legs 4 of the respective strut arrangement 3, half-shell-shaped mounting housings 25 (FIG. 2) are each designed for receiving a functional component (not shown).

With the aid of the above-mentioned compensating portions 23, a length compensation Δx (FIG. 3 or 4) can take place in the assembly stage with which mechanical component stresses between the baffle wall 1 and the plastic tank can be relieved. As can be seen from the figures, the total two compensating portions 23 in the support wall 17 are identical to each other. Thus, according to FIG. 3, each of the compensating portions 23 has an upper, first compensating web 27 and a lower, second compensating web 29. The two compensating webs 27, 29 bridge a free space 31, which is delimited by the mutually facing edges 33 of the wall segments 19, 20, 21. Each of the two compensating webs 27, 29 is in each case designed as a flat profile part, whose flat sides 35, 37 and narrow sides 39 form a rectangular cross-section. In addition, the two compensating webs 27, 29 each have a loop-like U-profile-shaped deformation section 41 (only shown in FIG. 4 or 5), which can be deformed by removing the component stresses. The deformation section 41 of the respective compensating web 27, 29 delimits a free deformation space 43 with its interior flat side 35.

The two compensating webs 27, 29 of a compensating portion 23, together with the wall segment edges 33, delimit the free space 31. In addition, the two compensating webs 27, 29 are arranged spatially differently, relative to one another, in order to provide a movement guidance of the wall segments 19, 20, 21. Thus, the upper, first compensating web 27 is aligned with its flat sides 35, 37 at right angles to the support wall 17, as a result of which a lateral movement of the wall segments 19, 20, 21 in the transverse direction y (FIG. 1), i.e., transverse to the support longitudinal direction x, is restricted. In addition, in each case support wall webs 45, which are formed in the adjacent wall segments 19, 20, 21 and extend at right angles therefrom, adjoin the upper first compensating web 27. In this way, the functional component support 1 in its entirety is provided with sufficient dimensional stability to simplify its handling as a pre-assembly unit.

The flat sides 35, 37 of the lower, second compensating web are no longer at right angles but rather aligned parallel to the adjacent wall surfaces of the wall segments 19, 20, 21. The flat sides 35, 37 of the lower compensating web 29 thereby merge flush with the adjacent wall segments 19, 20, 21.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fuel tank for a motor vehicle, which is a blow-molded plastic hollow member, the fuel tank comprising:
   at least one functional component support arranged in an interior space of the fuel tank, the functional component support being configured to have one or more functional components fastened thereto;
   at least two strut arrangements arranged to support the functional component support, the at least two strut arrangements being mutually spaced apart in a support longitudinal direction x and being supported in a direction perpendicular to the support longitudinal direction x on opposite upper and lower inner walls of the fuel tank; and
   at least one compensating portion that is positioned between the two strut arrangements and with which a length compensation is facilitated to relieve mechanical component stresses between the functional component support and the fuel tank,
   wherein the functional component support is an elongated support wall, the support wall being divided into wall segments with a respective one of the strut arrangements being embedded in each of the wall segments, and wherein mutually facing edges of adjacent wall segments are connected together via one of the at least one compensating portion,
   wherein the one of the at least one compensating portion includes a first compensating web and a second compensating web, the first compensating web extending between upper ends of the mutually facing edges of the adjacent wall segments and the second compensating web extending between lower ends of the mutually facing edges of the adjacent wall segments, and
   wherein the first compensating web has a U-shaped deformation section, the U-shaped deformation section protruding in the direction perpendicular to the support longitudinal direction x towards the upper inner wall of the fuel tank.

2. The fuel tank according to claim 1, wherein the first compensating web and the second compensating web are each adapted to merge with the adjacent wall segments integrally and/or in one piece.

3. The fuel tank according to claim 1, wherein the first compensating web and the second compensating web bridge a free space that is delimited by the mutually facing edges of the adjacent wall segments.

4. The fuel tank according to claim 1, wherein the at least one or more functional components comprise a fuel pump, a level indicator, and/or valves.

5. The fuel tank according to claim 1, wherein the at least one compensating portion is formed on the functional component support.

6. The fuel tank according to claim 1, wherein the second compensating web has a U-shaped deformation section and wherein each of the U-shaped deformation section of the first compensating web and the U-shaped deformation section of the second compensating web are deformed by removing the component stresses, and wherein the U-shaped deformation section of the first compensating web and the U-shaped deformation section of the second compensating web each delimit a respective deformation space.

7. The fuel tank according to claim 6, wherein the first compensating web and the second compensating web each have a flat profile, flat sides and narrow sides of which form a rectangular cross-section, and wherein one of the flat sides of the first compensating web and the second compensating web delimits the respective deformation space.

8. The fuel tank according to claim 7, wherein the flat sides of the first compensating web are aligned at right angles to the support wall to restrict a lateral movement of the wall segments transversely to the support longitudinal direction x.

9. The fuel tank according to claim 8, further comprising at least one support wall web that is connected to the first compensating web, and wherein the support wall web is arranged on at least one of the adjacent wall segments and projects therefrom at a substantially right angle.

10. The fuel tank according to claim 9, wherein the flat sides of the first compensating web merge flush with the at least one support wall web.

11. The fuel tank according to claim 7, wherein the flat sides of the second compensating web are aligned parallel to adjacent wall surfaces of the adjacent wall segments, and wherein the flat sides of the second compensating web merge flush with the adjacent wall surfaces.

12. The fuel tank according to claim 11, wherein the first and second compensating webs delimit a free space between the adjacent wall segments transversely to the support longitudinal direction x.

* * * * *